United States Patent
Ichise et al.

(10) Patent No.: US 6,988,485 B2
(45) Date of Patent: Jan. 24, 2006

(54) FUEL INJECTION CONTROL DEVICE FOR INTERNAL COMBUSTION ENGINE

(75) Inventors: Masaharu Ichise, Susono (JP); Toshimi Kashiwagura, Susono (JP); Shinichiro Nogawa, Mishima (JP); Takashi Hashima, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/026,038

(22) Filed: Jan. 3, 2005

(65) Prior Publication Data

US 2005/0155578 A1 Jul. 21, 2005

(30) Foreign Application Priority Data

Jan. 16, 2004 (JP) .............................. 2004-009781

(51) Int. Cl.
*F02B 17/00* (2006.01)
(52) U.S. Cl. ...................................... 123/430; 123/431
(58) Field of Classification Search ................ 123/430, 123/431
See application file for complete search history.

(56) References Cited

U.S. PATENT DOCUMENTS

| 5,875,743 A | 3/1999 | Dickey |
| 6,341,487 B1 * | 1/2002 | Takahashi et al. ............ 60/286 |
| 2002/0040692 A1 | 4/2002 | LaPointe et al. |
| 2003/0159434 A1 * | 8/2003 | Ikemoto et al. .............. 60/285 |
| 2003/0221661 A1 | 12/2003 | Willi et al. |
| 2005/0109320 A1 * | 5/2005 | Mashiki ...................... 123/431 |
| 2005/0178360 A1 * | 8/2005 | Satou .......................... 123/431 |

FOREIGN PATENT DOCUMENTS

| EP | 1 258 622 A2 | 11/2002 |
| JP | A 5-231221 | 9/1993 |
| JP | A 11-182283 | 7/1999 |
| JP | A 11-303669 | 11/1999 |
| JP | A 2003-13784 | 1/2003 |

* cited by examiner

*Primary Examiner*—John T. Kwon
(74) *Attorney, Agent, or Firm*—Oliff & Berridge, PLC

(57) ABSTRACT

An internal combustion engine (10) is provided with a port injector (28) and an in-cylinder injector (22). Before a port injection is started, the total amount of fuel to be injected is calculated (at an injection amount calculation timing). The port injection fuel amount and the in-cylinder injection fuel amount are calculated by appropriately dividing the total amount between them. If a change of the operating load on the internal combustion engine (10) is detected after the injection amount calculation timing, the load change is reflected in the amount of fuel to be injected in the current engine cycle by increasing or decreasing the in-cylinder injection fuel amount.

10 Claims, 6 Drawing Sheets

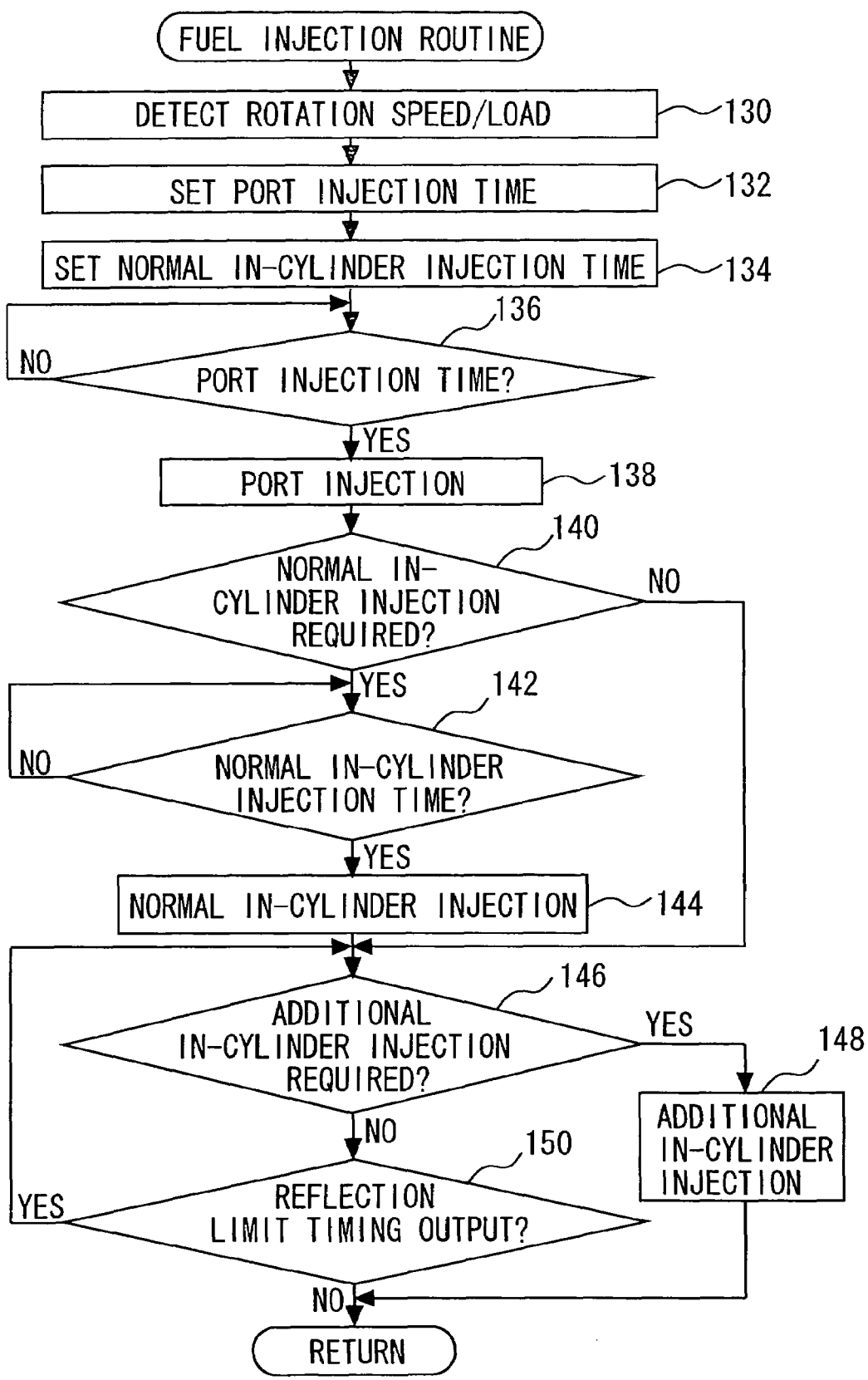

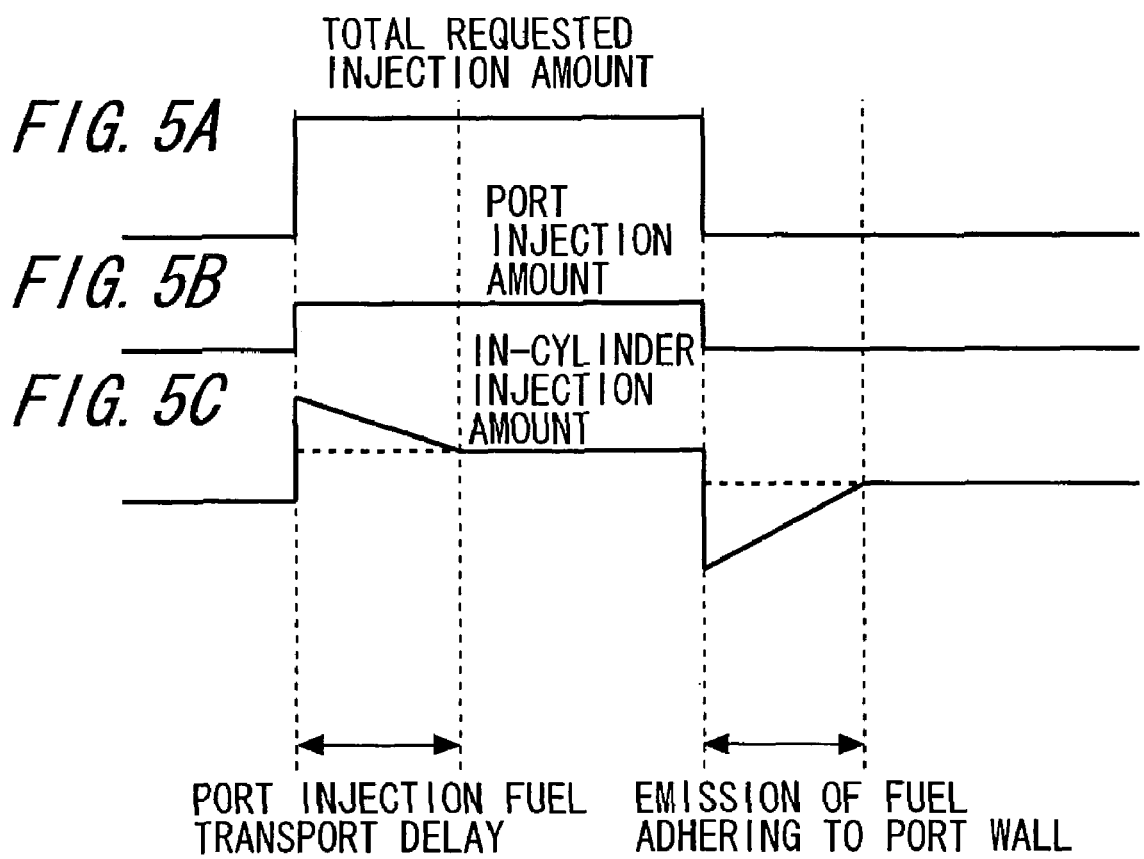

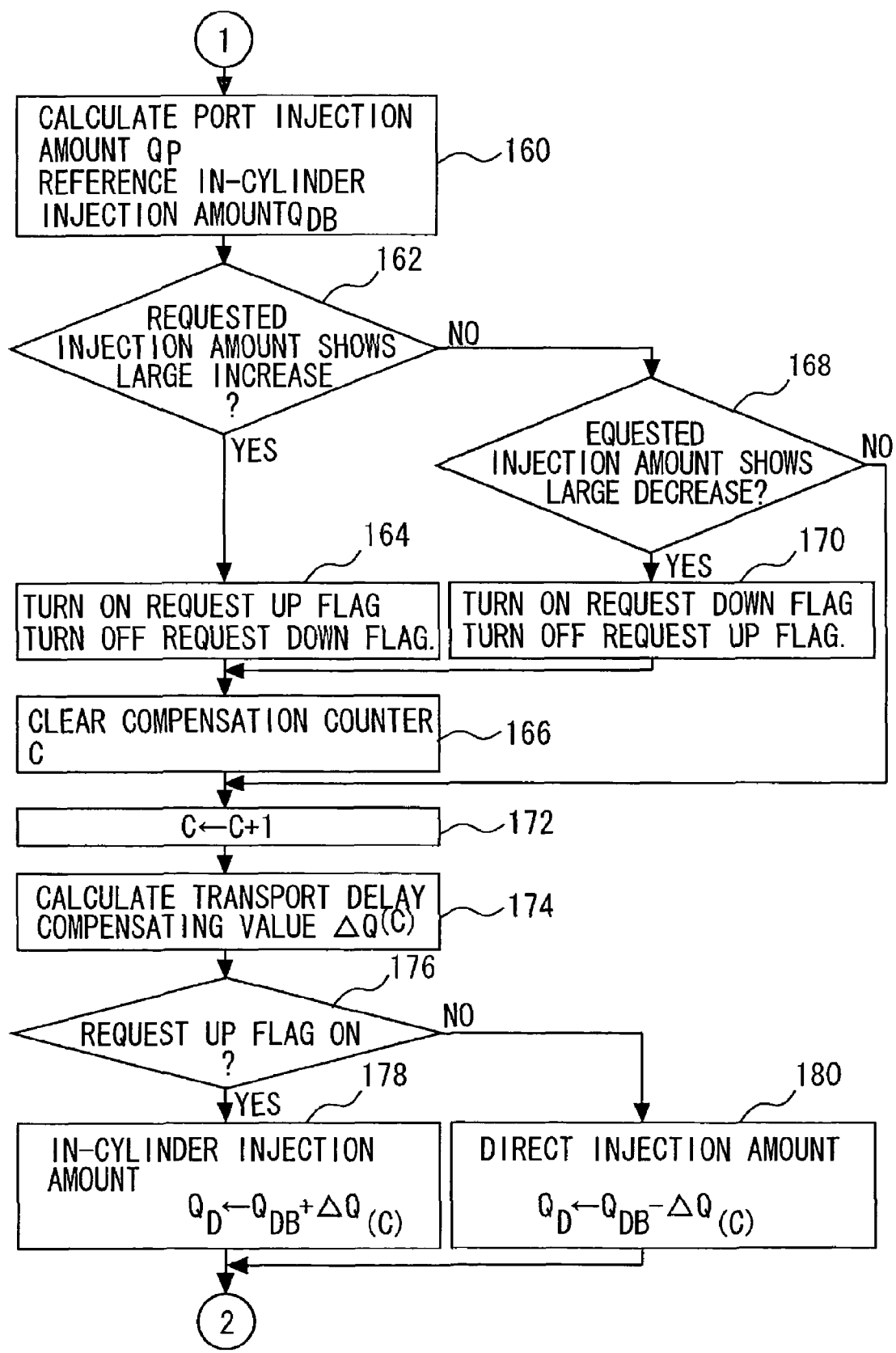

FUEL INJECTION CONTROL DEVICE FOR INTERNAL COMBUSTION ENGINE

BACKGROUND OF THE INVENTION

1. Field of the Invention

The present invention relates to a fuel injection control device for an internal combustion engine and, more particularly, to a fuel injection control device for an internal combustion engine which is provided with a port injector to inject fuel into the intake port and an in-cylinder injector to inject fuel into the cylinder.

2. Background Art

As conventional internal combustion engines, those comprising a port injector to inject fuel into the intake port and an in-cylinder injector to inject fuel into the cylinder are known as disclosed in, for example, Japanese Patent Laid-open No. 2003-13784. In such a prior art internal combustion engine operating under certain conditions, port injection by a port injector is combined with in-cylinder injection by an in-cylinder injector so as to form a fuel-rich layer near the spark plug while introducing uniform mixture into the cylinder. According to this fuel injection technique, it is possible to keep lean the air-fuel ratio of the mixture while producing stable combustion in the cylinder. Hereinafter, such an internal combustion engine is denoted as a "dual-injector type internal combustion engine".

In a dual-injector type internal combustion engine which concurrently performs both port injection and in-cylinder injection, the injection ratio between them must be controlled to an appropriate value. Conventionally, such an internal combustion engine therefore determines both the port injection fuel amount and the in-cylinder injection fuel amount at a predetermined injection amount calculation timing just before port injection is started. Then, the internal combustion engine successively drives the port injector and the in-cylinder injector so as to implement port and in-cylinder fuel injections of the determined respective amounts. According to this control technique, fuel can be injected into the intake port and the cylinder at an appropriate ratio, allowing stable combustion with a lean air-fuel mixture.

Including the above-mentioned document, the applicant is aware of the following documents as a related art of the present invention.

[Patent Document 1] Japanese Patent Laid-open No. 2003-13784

[Patent Document 2] Japanese Patent Laid-open No. 11-182283

[Patent Document 3] Japanese Patent Laid-open No. 5-231221

[Patent Document 4] Japanese Patent Laid-open No. 11-303669

In the above-mentioned prior art internal combustion engine, however, the port injection fuel amount and the cylinder injection fuel amount are calculated only once per engine cycle just before port injection is started. Therefore, if the load on the internal combustion engine changes or the change is detected after the calculation, the load change is not reflected in the fuel injection amount until the next engine cycle. More specifically, in the above-mentioned prior art internal combustion engine, any change in the load (intake air flow) during actual air intake, which may occur after the fuel injection amount is calculated and just before the port injection (intake stroke) is started, is not reflected in the fuel injection amount.

If the load change is not reflected in the fuel injection amount, no large change occurs in the torque of the internal combustion engine. This means that the conventional dual-injector type internal combustion engines leave room for improvement in terms of response to load changes.

SUMMARY OF THE INVENTION

The present invention has been made to solve the above-mentioned problem. It is an object of the present invention to provide a fuel injection control device which enables an internal combustion engine to make excellent responses to load changes.

The above object is achieved by a fuel injection control device for an internal combustion engine. The control device includes an operating load detecting unit for detecting an operating load on the internal combustion engine. A port injector is provided for port injection. An in-cylinder injector is provided for in-cylinder injection. The control device also includes a fuel amount calculating unit for calculating a port injection amount of fuel to be injected from the port injector and a reference in-cylinder injection amount of fuel to be injected from the in-cylinder injector at a predetermined injection amount calculation timing based on the operating load. The control device further includes a port injection control unit which starts a port injection before an in-cylinder injection so as to inject said port injection amount of fuel from the port injector. There is also provided a correction fuel amount calculation unit which calculates a fuel correction amount for a change of the operating load on the internal combustion engine if the change is detected after the injection amount calculation timing and before a reflection limit timing until which the amount of fuel to be injected from the in-cylinder injector. There is further provided an in-cylinder injection control unit which executes the in-cylinder injection after the port injection so as to inject an amount of fuel from the in-cylinder injector wherein the amount of fuel is determined based on the reference in-cylinder injection amount and the correction amount.

Other objects and further features of the present invention will be apparent from the following detailed description when read in conjunction with the accompanying drawings.

BRIEF DESCRIPTION OF DRAWINGS

FIG. 4 is a flowchart of a fuel injection routine which is executed in the first embodiment of the present invention;

FIGS. 5A to 5C are timing charts for explaining how the cylinder injection fuel amount is calculated in a second embodiment of the present invention; and FIG. 6 is a flowchart for explaining a processing sequence which is executed in the second embodiment of the present invention in place of step 106 in FIG. 3.

BEST MODE FOR CARRYING OUT THE INVENTION

First Embodiment

[System Configuration of First Embodiment]

Figure 1:
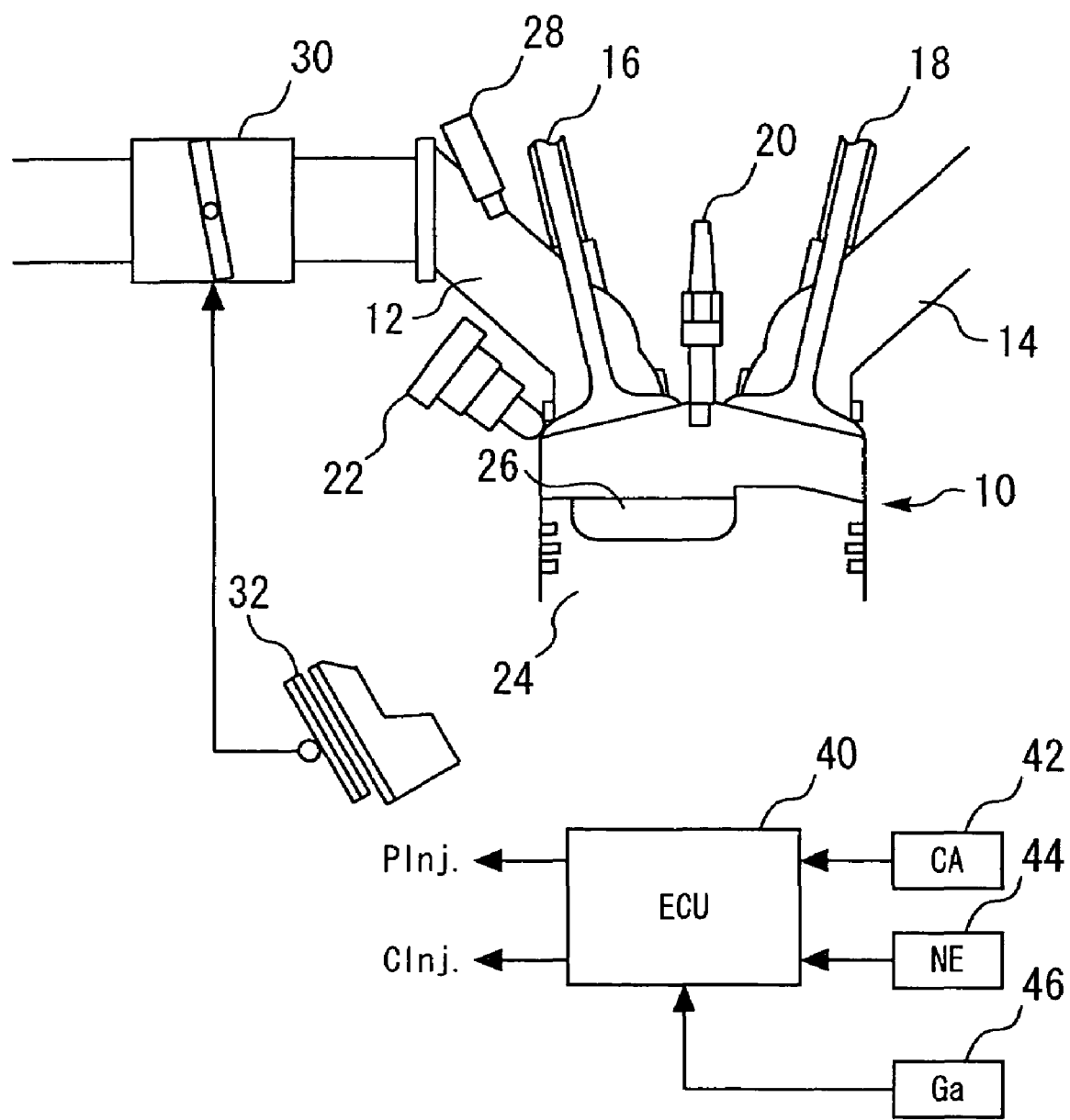
FIG. 1 is a diagram for explaining the configuration of a first embodiment of the present invention.

FIG. 1 is provided to explain the configuration of a first embodiment of the present invention. As shown in FIG. 1, this system embodiment has an internal combustion engine 10. The internal combustion engine 10 is communicated with an intake port 12 and an exhaust port 14. An intake valve 16 is provided between the intake port 12 and the in-cylinder space of the internal combustion engine 10. An exhaust valve 18 is provided between the exhaust port 14 and the in-cylinder space of the internal combustion engine 10.

In addition, a spark plug 20 and an in-cylinder injector (DInj) 22 for direct injection into the cylinder are set to the internal combustion engine 10. The tip of the spark plug 20 is exposed in the middle of the in-cylinder space. The tip of the in-cylinder injector 22 is directed toward the center of the in-cylinder space. The piston 24 of the internal combustion engine 10 has a cavity 26 formed on its top surface. Fuel, injected from the in-cylinder injector 22 at a predetermined timing, is reflected by the wall of the cavity 26 to form a gas layer near the tip of the spark. Thus, the in-cylinder injector 22 generates a rich mixture only near the spark plug 20, making it possible to secure stable operation with a smaller amount of fuel, that is, realize what is called stratified operation.

A port injector 28 is set to the intake port 12. The port injector 28 can inject fuel into the intake port 12. Injecting fuel into the intake port 12 makes it possible to introduce a uniformly concentrated mixture into the cylinder. By combining port fuel injection through the port injector 28 with in-cylinder fuel injection through the in-cylinder injector 22 in a specific operating region, the system of this embodiment can realize stable operation with less fuel.

A throttle valve 30 is provided upstream of the intake port 12. The amount Ga of air which is taken into the internal combustion engine 10 increases or decreases depending on the opening degree of the throttle valve 30. Since the throttle valve 30 acts in conjunction with an accelerator pedal 32, the air intake amount Ga can be adjusted by operating the accelerator.

As shown in FIG. 1, the system of this embodiment is provided with an ECU (Electronic Control Unit) 40. The ECU 40 is connected with a crank angle sensor 42, a revolution sensor 44, an air flow meter 46 and other sensors. Based on the outputs of these sensors, the ECU 40 can detect the crank angle CA, revolution speed NE, intake air amount Ga of the internal combustion engine 10 and the like. The ECU 40 is also connected with the above-mentioned in-cylinder injector 22 and port injector 28. Based on the operating condition of the internal combustion engine 10, detected through the various sensors, the ECU 40 can drive these injectors 22 and 28 so as to make appropriate the port injection fuel amount and the in-cylinder injection fuel amount.

[Fuel Injection Patterns in First Embodiment]

In the system of this embodiment, fuel injection is selected from dual fuel injection performing both port injection and in-cylinder injection (denoted as "port-in-cylinder injection"), port-only fuel injection, etc. according to the operating condition of the internal combustion engine 10. Referring to FIG. 2, the following describes the fuel injection patterns used in this system embodiment.

Figure 2A:
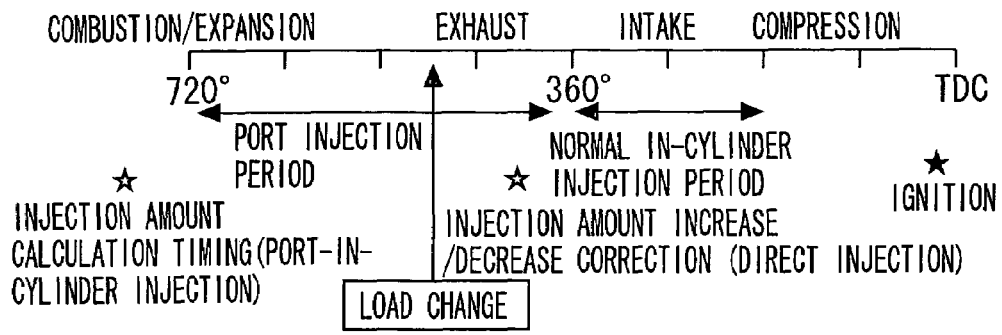
FIGS. 2A to 2D are diagrams for explaining the fuel injection patterns used in the first embodiment of the present invention.

FIG. 2A is provided to explain an injection pattern which occurs when port-in-cylinder injection is requested at the injection amount calculation timing, then a change of the operating load (namely, the intake air amount Ga) on the internal combustion engine 10 is detected during the port injection period. In FIG. 2A, the point "Injection Amount Calculation Timing" is a point of time at which the port injection fuel amount and the in-cylinder injection fuel amount are calculated for the internal combustion engine 10.

In this embodiment, the injection amount calculation timing differs depending on each cylinder. The injection amount calculation timing for a cylinder is a predetermined point of time which immediately precede the start of the combustion/expansion stroke. At the point of time, the ECU 40 calculates a fuel injection amount depending on the operating condition of the internal combustion engine 10 and, further, calculates a port injection fuel amount and a in-cylinder injection fuel amount so as to divide the calculated fuel injection amount between port injection and in-cylinder injection according to a predetermined rule. Hereinafter, the in-cylinder injection fuel amount calculated at this timing is specially referred to as the "reference in-cylinder injection fuel amount".

In a port-only injection region, zero is obtained as the reference in-cylinder injection fuel amount. In FIG. 2A, since the example is a pattern for the region in which port-in-cylinder injection should be done, a non-zero value is obtained at the injection amount calculation timing as the reference in-cylinder injection fuel amount.

In the system of this embodiment, the port injection period is defined such that it roughly agrees with the period during which the combustion/expansion stroke and exhaust stroke are done (the 360 CA° period from the top dead center of compression to the top dead center of exhaust) as shown in FIG. 2A. Depending on the operating condition of the internal combustion engine 10, an appropriate point of time is set in the port injection period by the ECU 40 as the port injection time. At this port injection time, the amount of fuel calculated as mentioned above is injected from the port injector 28.

In the system of this embodiment, the normal cylinder injection period is defined such that it roughly agrees with the period during which the intake stroke is done (the 180 CA° period from the top dead center of exhaust to the bottom dead center of intake). Depending on the operating condition of the internal combustion engine 10, an appropriate point of time is set in the normal in-cylinder injection period by the ECU 40 as the normal in-cylinder injection time. At this normal in-cylinder injection time, the in-cylinder injector 22 begins to inject the reference in-cylinder injection amount of fuel calculated as mentioned above.

Even after the injection amount calculation timing, the ECU 40 can correct the amount of fuel to be injected by the normal in-cylinder injection until the normal in-cylinder injection is started. Hereinafter, the deadline for this correction is referred to as the "limit timing". In the example of FIG. 2A, since a load change is detected earlier than the limit timing, the amount of fuel to be injected by the normal in-cylinder injection can be corrected according to the load change. Performing such a correction improves the response of the internal combustion engine 10 and makes its air-fuel ratio control more accurate since a load change which occurs after the injection fuel amount calculation timing can be reflected in the total amount of fuel to be injected in the current engine cycle.

As shown in FIG. 2A, therefore, if the operating load on the internal combustion engine 10 changes between the injection fuel calculation timing and the limit timing in this system embodiment, a positive or negative correction is given to the reference in-cylinder injection fuel amount in accordance with the load change. The "Injection Amount Increase/Decrease Correction" in FIG. 2A indicates an instance of this correction timing. Since correction is made in this manner, the system of this embodiment can show excellent response to load changes which may occur between the injection fuel calculation timing and the limit timing while keeping high the air-fuel ratio control accuracy.

The total fuel injection amount determined at the injection amount calculation timing can therefore be either increased or decreased by correcting the amount of fuel to be injected by the normal in-cylinder injection. According to the injection pattern shown in FIG. 2A, even if the operating load changes after the injection amount calculation timing, it is possible to inject an appropriate amount of fuel according to the load change in the current engine cycle regardless of whether the load change is increases or decrease. The injection pattern shown in FIG. 2A is effective for both increase and decrease in the load.

Figure 2B:
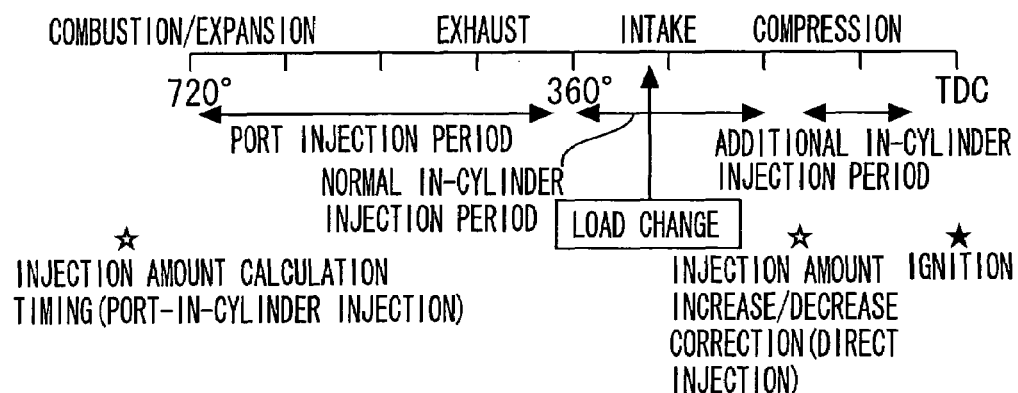

FIG. 2B is provided to explain an injection pattern which occurs when port-in-cylinder injection is requested at the injection amount calculation timing and then an increase of the operating load on the internal combustion engine 10 is detected after the normal in-cylinder injection is started (after the limit timing). In this case, since the change of the load on the internal combustion engine 10 is detected later than the limit timing, this change cannot be reflected in the amount of fuel to be injected by the normal in-cylinder injection.

However, since the normal in-cylinder injection terminates during the intake stroke, there remains some time which may allow re-execution of an in-cylinder injection. If in-cylinder injection is re-executed by using this time, the total amount of fuel to be injected in the current engine cycle, determined at the injection amount calculation timing, can be given a positive correction.

That is, even if the load on the internal combustion engine 10 changes later than the limit timing, as long as the change is detected at a time from which another in-cylinder injection can be completed before the ignition, although it is not possible to correct the total fuel injection amount to a lower amount in the current engine cycle, it is possible to correct the total fuel injection amount to a higher amount. Hereinafter, the deadline for executing another in-cylinder injection is referred to as the "reflection limit timing".

Therefore, if a change or, more specifically, an increase in the load on the internal combustion engine is detected between the limit timing and the reflection limit timing, the system of this embodiment executes another fuel injection so as to correct the injection fuel amount according to the increase of the load. Hereinafter, "additional in-cylinder injection" is used to refer to such an in-cylinder injection, namely, an in-cylinder injection that is done in order to correct the fuel injection amount in accordance with a load increase that occurs after the injection amount calculation timing.

In the example shown in FIG. 2B, port-in-cylinder injection is requested at the injection amount calculation timing and then a load increase is detected during the intake stroke. In this case, since the load increase is detected earlier than the reference limit timing, the ECU 40 can perform an additional in-cylinder injection. The "Injection Amount Increase Correction" in FIG. 2B indicates a timing at which the amount of fuel to be injected for correction by the additional in-cylinder injection is set, that is, the amount of fuel corresponding to the load increase is set for correction.

Further, in an engine cycle which requires port-in-cylinder injection, a certain period during the compression stroke is defined as the "additional in-cylinder injection period" as shown in FIG. 2B. Depending on the operating condition of the internal combustion engine 10, an appropriate point of time is set in the additional in-cylinder injection period by the ECU 40 as the additional in-cylinder injection time. At this additional in-cylinder injection time, the additional in-cylinder injection is performed to inject the previously set amount of fuel. According to the procedure described so far, if the load on the internal combustion engine 10 increases between the limit timing and the reflection limit timing, the load increase can be reflected in the total amount of fuel to be injected in the current engine cycle. Thus, the injection pattern shown in FIG. 2B makes it possible to realize excellent response to such load increases while keeping highly accurate air-fuel ratio control.

Figure 2C:
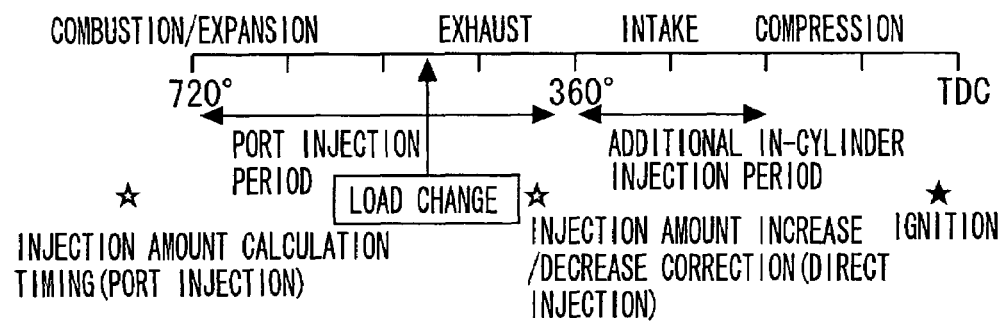

FIG. 2C is provided to explain an injection pattern which occurs if port-only injection is requested at the injection amount calculation timing and then an increase of the operating load on the internal combustion engine 10 is detected during the port injection period. If the load on the internal combustion engine 10 is detected as changed at such a timing, its change cannot be reflected in the port injection fuel amount. However, if the load change is an increase, it is possible to correct the fuel amount in accordance with the load increase by performing an additional in-cylinder injection after the port injection.

"Injection Amount Increase Correction" in FIG. 2C indicates a timing at which the amount of fuel to be injected for correction in accordance with the detected load increase is set. "Additional Cylinder Injection Period" also in FIG. 2C is substantially identical to the normal in-cylinder injection period shown in FIG. 2A. That is, if port-only injection is requested at the injection amount calculation timing and then a load increase is detected earlier than the above-mentioned limit timing, the system of this embodiment sets an additional in-cylinder injection period which is identical to the normal in-cylinder injection period shown in FIG. 2A. Then, according to the operating condition of the internal combustion engine 10, the ECU 40 sets an appropriate point of time in the additional in-cylinder injection period as the additional in-cylinder injection time and performs the additional in-cylinder injection at the additional in-cylinder injection time.

According to the above-mentioned procedure, if only port injection is requested at the injection amount calculation timing and then a load increase is detected earlier than the limit timing, execution of a port injection can be followed by an in-cylinder injection as if port-in-cylinder injection was requested. Thus, the injection pattern shown in FIG. 2C makes it possible to realize excellent response and excellent air-fuel ratio control accuracy in a case where load increase occurs under such conditions that port-only injection is requested.

Figure 2D:
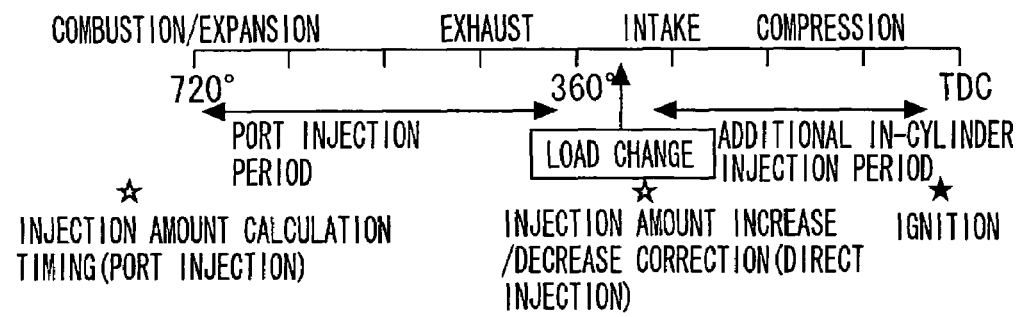

FIG. 2D is provided to explain an injection pattern which occurs if port-only injection is requested at the injection amount calculation timing and then an increase of the operating load on the internal combustion engine 10 is detected during the intake stroke, that is, the load increase is detected later than a timing at which a normal in-cylinder injection should be started. In this case, immediately after the load change (increase) is detected, "Injection Amount Increase Correction" is performed as shown in FIG. 2D, that is, the amount of fuel for correction in accordance with the load increase is set.

Further in this case, a period which continues until just before the reflection limit timing is set as "Additional Cylinder Injection Period" after "Injection Amount Increase Correction" is done. Then, according to the operating condition of the internal combustion engine 10, the ECU 40 sets an appropriate point of time in the additional in-cylinder injection period as the additional in-cylinder injection time and performs the additional in-cylinder injection at the additional in-cylinder injection time.

According to the above-mentioned procedure, if port-only injection is requested at the injection amount calculation timing and then a load increase is detected earlier than the reflection limit timing, an in-cylinder injection can make up the fuel shortfall left by the port injection. Thus, similar to the injection pattern shown in FIG. 2C, this injection pattern in FIG. 2D makes it possible to realize excellent response and excellent air-fuel ratio control accuracy in a case where load increase occurs under such conditions that port-only injection is requested.

[Practical Processing in First Embodiment]

Figure 3:
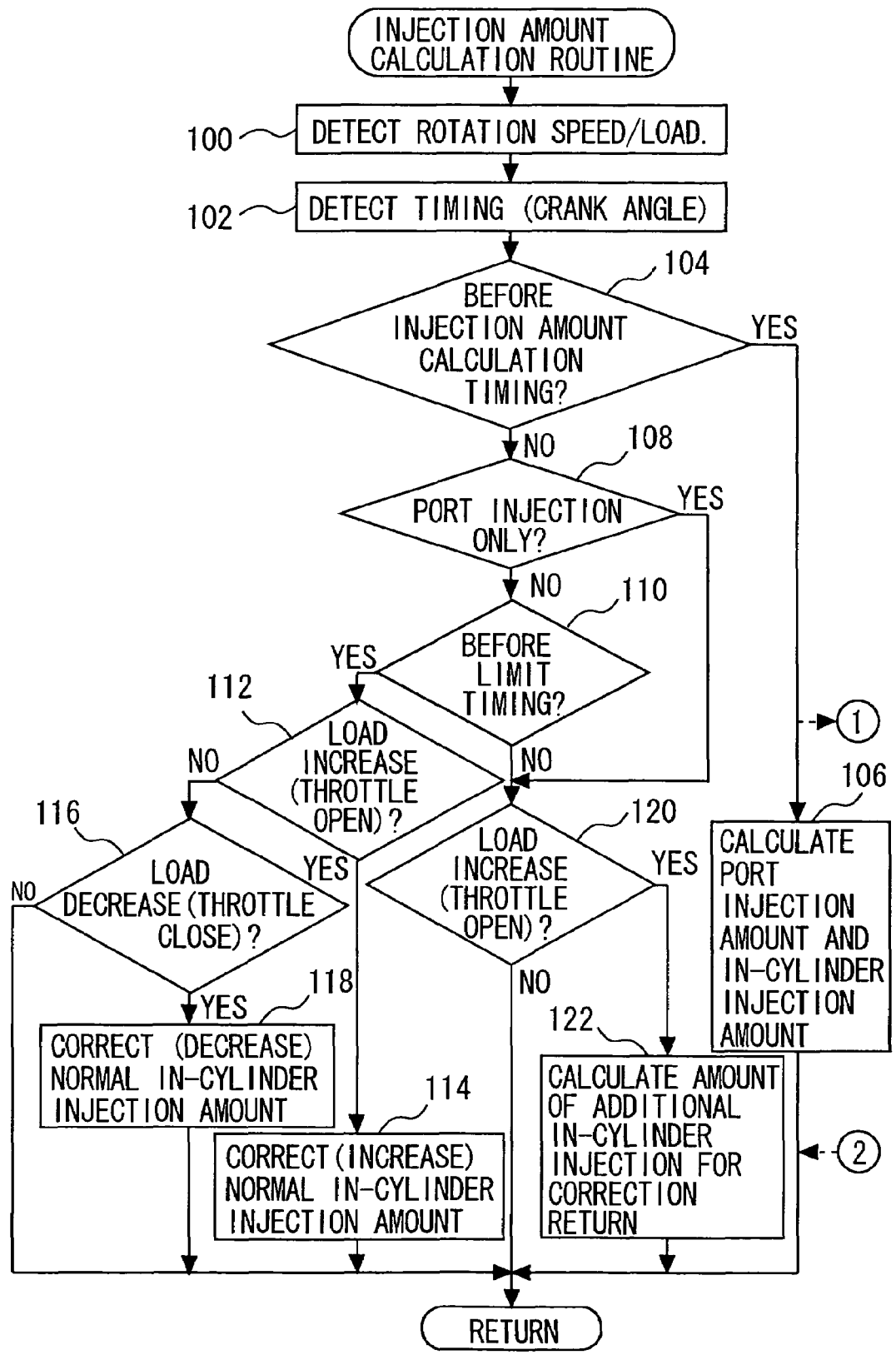
FIG. 3 is a flowchart of an injection amount calculation routine which is executed in the first embodiment of the present invention.

The ECU 40 implements the aforementioned fuel injection patterns by executing the routines shown in FIGS. 3 and 4. The following will describe the details of these routines step by step. FIG. 3 is a flowchart of an injection amount calculation routine which is executed by the ECU 40 in order to calculate the amount of fuel to be injected by the port injection, the amount of fuel to be injected by the normal in-cylinder injection and the amount of fuel to be injected by the additional in-cylinder injection.

The routine shown in FIG. 3 is activated periodically, for example, every 1 msec. If this routine is activated, the operating condition of the internal combustion engine 10, namely the engine revolution speed NE and the engine load are detected at first based on the individual sensor outputs (step 100). Then, the location of the current timing in the current cycle of the internal combustion engine 10 is detected. Specifically, the current crank angle CA of the internal combustion engine 10 is detected (step 102).

Then, based on the detected crank angle CA, it is judged whether the current timing is earlier than the injection amount calculation timing (step 104). The crank angle which corresponds to the deadline for performing an additional in-cylinder injection, namely the reflection limit timing, is stored in the ECU 40. The crank angle which corresponds to the injection amount calculation timing is also stored in the ECU 40. By comparing these crank angles with the current crank angle, this step 104 judges whether the current timing is later than the reflection limit timing but earlier than the injection amount calculation timing. If the condition is true, the judgment result is "Before Injection Amount Calculation Timing".

If the judgment result in the above-mentioned step 104 is "Before Injection Amount Calculation Timing", a port injection fuel amount and an in-cylinder injection fuel amount (reference in-cylinder injection fuel amount) which are appropriate to the current operating condition are calculated (step 106). Upon completion of this step 106 processing, this activated routine is immediately terminated. If the above processing is repeated, the reference port injection fuel amount and the reference in-cylinder injection fuel amount can be calculated as respective values that are appropriate for the current operating condition at a timing of injection amount calculation.

If the judgment result of the above-mentioned step 104 in the routine of FIG. 3 is not "Before Injection Amount Calculation Timing", it is judged whether port-only injection was requested at the injection amount calculation timing (step 108). If the result is that the requested injection is not port-only injection, it is recognized that the requested injection is port-in-cylinder injection. In this case, it is judged whether the current timing is earlier than the limit timing (step 110).

If the judgment result of the above-mentioned step 110 is "Before Limit Timing", the change of the load on the internal combustion engine 10 can be reflected in the amount of fuel to be injected by the normal in-cylinder injection. In this case, it is judged at first whether the current load has increased from the load which was detected at the injection amount calculation timing (step 112). Practically, if the opening of the throttle shows a meaningful increase, this step 112 judges that the load has increased. If a load increase is recognized, the amount of fuel to be injected by the normal in-cylinder injection is increased for correction (step 114).

If any load increase is not recognized in the above-mentioned step 112, it is judged whether the current load has decreased from the load detected at the injection amount calculation timing (step 116). Practically, if the opening of the throttle shows a meaningful decrease, this step 116 judges that the load has increased. If a load decrease is recognized, the amount of fuel to be injected by the normal in-cylinder injection is decreased for correction (step 118). If any load decrease is not recognized, this activated routine is immediately terminated.

If it is judged in the above-mentioned step 108 that the injection requested at the injection amount calculation timing is port-only injection and in the above-mentioned step 110 that the current timing is already later than the limit timing, it is judged whether an additional in-cylinder injection is necessary. Specifically, it is judged whether the current load (opening degree of the throttle) shows a meaningful increase from the load (opening degree of the throttle) detected at the injection amount calculation timing (step 120).

If a load increase is recognized as the result of the above-mentioned judgment, the amount of fuel to be injected by the additional in-cylinder injection for correction is calculated (step 122). If no load increase is recognized in step 120, performing an additional in-cylinder injection is judged to be not necessary. In this case, this activated routine is terminated without doing any processing to increase the amount of fuel to be injected.

According to the injection amount calculation routine described so far, a port injection fuel amount and a reference in-cylinder injection fuel amount, which are appropriate for the current operating condition, can be calculated at the injection amount calculation timing. In addition, if a load change is detected before the limit timing under such conditions that port-in-cylinder injection is requested, the amount of fuel to be injected by the normal in-cylinder injection can be increased or decreased for correction (refer to FIG. 2A). Likewise, if a load increase is detected after the limit timing, the amount of fuel to be injected by an additional in-cylinder injection can be calculated (refer to FIG. 2B). Further, under such conditions that port-only injection is requested, corrected fuel injection amount which matches to a load increase detected after the injection amount calculation timing can be calculated as fuel amount to be injected by an additional in-cylinder injection (refer to FIG. 2C and FIG. 2D).

FIG. 4 is a flowchart of a routine executed by the ECU 40 in order to actually inject the amount of fuel, calculated by the routine of FIG. 3, through port injection or in-cylinder injection. The routine shown in FIG. 4 is repeatedly activated each time its processing completes. If this routine is activated, the engine rotation speed NE and the engine load are detected at first based on the individual sensor outputs (step 130).

Then, based on the engine rotation speed NE and the engine load, a port injection time and a normal in-cylinder injection time are set (steps 132 and 134). Then, based on the current crank angle CA, it is judged whether the port injection time has come (step 136). If it is judged that the port injection time has come, processing for port injection is executed (step 138). Practically, the port injector 28 is driven so as to inject the amount of fuel calculated by the routine of FIG. 3.

Then, it is judged whether normal in-cylinder injection is requested (step 140). In this step 140, it is judged that normal in-cylinder injection is not requested if a non-zero value is set by the routine of FIG. 3 as the amount of fuel to be injected by the normal in-cylinder injection, that is, a non-zero value is calculated at the injection amount calculation timing as the reference in-cylinder injection fuel amount (refer to the aforementioned step 106).

If it is judged in the above-mentioned step 140 that normal in-cylinder injection is not requested, the routine jumps steps 142 and 144 described below. Otherwise, it is judged based on the current crank angle whether the normal in-cylinder injection time has come (step 142).

If the judgment result is that the normal in-cylinder injection time has come, processing is executed in order to inject a proper amount of fuel from the in-cylinder injector 22 (step 144). Practically, the in-cylinder injector 22 is driven so as to inject the amount of fuel calculated last by the aforementioned step 106, 114 or 118 of the routine shown in FIG. 3.

Then, in the routine shown in FIG. 4, it is judged whether additional in-cylinder injection is requested (step 146). In this step 146, it is recognized that additional in-cylinder injection is requested if an amount of fuel to be injected by an additional in-cylinder injection was calculated by the step 122 processing in the routine of FIG. 3.

If a request for additional in-cylinder injection is recognized, the in-cylinder injector 22 is driven so as to inject the amount of fuel calculated by the above-mentioned step 122 for correction (step 148). Meanwhile, if it is judged that no request is recognized for additional in-cylinder injection, it is judged based on the current crank angle whether the current timing is earlier than the reflection limit timing (step 150).

If the current timing is judged to be earlier than the reflection limit timing, the above-mentioned step 146 processing is executed again since there remains the possibility that a request for additional in-cylinder injection may occur in the current engine cycle. Then, if the reflection limit timing comes without a request for additional in-cylinder injection, the step 150 produces a negative judgment, terminating the this activated routine.

As described so far, according to the routine shown in FIG. 4, if execution of a normal in-cylinder injection is requested, a port injection can be followed by execution of a normal in-cylinder injection. According to the routine of FIG. 3, when a normal in-cylinder injection is started, load change is reflected in the amount of fuel to be injected by the normal in-cylinder injection. Thus, the system of this embodiment can implement the injection pattern shown in FIG. 2A.

Moreover, according to the system of this embodiment, corrected fuel amount that matches engine load increase is calculated at step 120 shown in FIG. 3, if the engine load increase is detected after the port injection and the normal in-cylinder injection have done and before the reflection limit timing has come. Then, if corrected fuel amount is calculated as described above, the additional in-cylinder injection is executed for injecting the corrected fuel amount by the routine shown in FIG. 4. Thus, the system of this embodiment can implement the injection pattern shown in FIG. 2B.

Further, in the system of this embodiment, if port-only injection is requested at the injection fuel amount calculation timing, the necessity of normal in-cylinder injection is negated according to the routine shown in FIG. 4. Even in this case, after the port injection, it is possible to immediately begin to judge whether additional in-cylinder injection is necessary. If an engine load increase is detected before the reflection limit timing, the amount of fuel corresponding to the increase is calculated for correction by step 120 in FIG. 3. In this case, an additional in-cylinder injection can be executed to inject the corrected fuel amount according to the routine shown in FIG. 4. Thus, the system of this embodiment can implement the injection patterns shown in FIGS. 2C and 2D.

As described so far, the system of this embodiment can selectively implement an appropriate injection pattern, any of those shown in FIG. 2A through FIG. 2D, according to the request made at the injection amount calculation timing, and the timing at which the load change is detected. Consequently, the system of this embodiment can realize an internal combustion engine 10 capable of showing excellent response to load changes and maintaining high accuracy air-fuel ratio control.

Note that in the aforementioned first embodiment, when the load on the internal combustion engine 10 is recognized as changed, the amount of fuel to be injected is corrected in such a manner as to improve not only the response to the load change but also the air-fuel control accuracy. However, how to correct the injection fuel amount is not limited to this manner. For example, correction may be done so as to intentionally make richer the air-fuel ratio if improvement of the response is given higher priority.

Second Embodiment

Referring to FIGS. 5 and 6, the following describes a second embodiment of the present invention. In terms of hardware configuration, the system of this embodiment is the same as that of the first embodiment. That is, the system of this embodiment is provided with both an in-cylinder injector 22 and a port injector 28 which are identical to those in the first embodiment.

[Characteristics of Second Embodiment]

In the internal combustion engine 10, some transport delay occurs until fuel is introduced into the cylinder after the fuel is injected from the port injector 28. Therefore, increasing or decreasing the port injection fuel amount according to the change of the engine load is not immediately reflected in the amount of fuel to be injected into the cylinder from the intake port 12. Consequently, in a transient period responding to a load increase, the amount of fuel entering the cylinder from the intake port 12 is smaller than the ideal value. Also in a transient period responding to a load decrease, the mount of fuel entering the cylinder from the intake port 12 is larger than the ideal value.

On the contrary, the fuel injected from the in-cylinder injector 22 is supplied into the cylinder without transport delay. Therefore, when the amount of fuel injected into the cylinder from the intake port 12 is deficient, the in-cylinder injection fuel amount can be increased so as to compensate for the deficiency. Likewise, when the amount of fuel injected into the cylinder from the intake port 12 is excessive, the in-cylinder injection fuel amount can be decreased so as to compensate for the surplus. Using this capability of the in-cylinder injector 22, the total injection fuel amount can be controlled to an ideal value in each engine cycle even during transient periods.

FIG. 5 is a timing chart for explaining an in-cylinder injection fuel amount calculation method which is used to implement the above-mentioned capability in this embodiment. More specifically, FIG. 5A shows the waveform of the total requested injection amount corresponding to load change. FIG. 5B shows the waveform of the calculated port injection amount corresponding to the transition of the total requested injection amount. FIG. 5C shows the transition of the in-cylinder injection amount which would occur following the transition of the total requested injection amount (broken line) and the transition of the in-cylinder injection amount which includes the amount of fuel which compensates for the effect of the fuel transport delay (solid line).

The amount of fuel which enters the cylinder from the intake port 12 shows the largest transport delay effect immediately after the total requested injection amount is changed. Then, the transport delay effect decreases with time after the change occurs. Therefore, the largest compensating fuel amount is given to the in-cylinder injection amount when the total requested injection amount is changed, and then the compensating fuel amount is gradually reduced with time, as shown in FIG. 5C in the system of this embodiment.

[Practical Processing in Second Embodiment]

FIG. 6 is a flowchart showing the flows of processing executed by the ECU 40 in this embodiment in order to implement the above-mentioned capability. These flows of processing are to replace the processing of the step 106 in the routine of FIG. 3. That is, this processing sequence is to be executed if step 104 in the routine of FIG. 3 judges the current timing to be "Before Injection Amount Calculation Timing".

In the processing sequence shown in FIG. 6, a total requested injection amount is calculated at first based on the operating condition and then a port injection fuel amount $Q_p$ and a reference in-cylinder injection fuel amount $Q_{DB}$ are calculated by dividing the requested amount between them at a predefined ratio (step 160). Then, it is judged whether this total requested injection amount is greatly larger than the total requested injection amount which was previously calculated by the routine (whether an increase beyond a predefined value is recognized) (step 162).

If it is judged that the total requested injection amount shows such a great increase, a request up flag is turned ON to indicate a sharp increase in the engine load while a request down flag is turned OFF (step 164). In addition, a compensation counter C is cleared so as to be associated with the start of a transient period (step 166).

On the contrary, if the aforementioned step 162 results in a negative judgment, it is judged whether this total requested injection amount is greatly smaller than the total requested injection amount which was previously calculated by the routine (whether a decrease beyond a predefined value is recognized) (step 168). If it is judged that the total requested injection amount shows such a great decrease, the request down flag is turned ON to indicate a sharp decrease in the engine load while the request up flag is turned OFF (step 170). Since this time point is also a start time of a transient period, the aforementioned processing of step 166 is executed in order to clear the compensation counter C.

If it is judged by the aforementioned step 168 that the total requested injection amount does not show a sharp decrease, processing goes to step 172 while maintaining the status of the request up flag, that of the request down flag and the count value of the compensation counter C. In step 172, the compensation counter C is incremented. By the procedure described so far, the elapsed time since the occurrence of a sharp change in the total requested injection amount is measured by the compensation counter C.

Then, in FIG. 6, a transport delay compensating value $\Delta Q_{(c)}$ is calculated to compensate the port injection fuel for the transport delay effect (step 174). The transport delay compensating value $\Delta Q(c)$ is a function of the magnitude of the change in the total requested injection amount and the count value of the compensation counter C. Practically, when the count value of the compensation counter C is "1", that is, immediately after a sharp change is detected in the total requested injection amount by step 162 or 168, the ECU 40 calculates the initial value of the transport delay compensating value $\Delta Q_{(c)}$ based on the magnitude of the change detected in the total requested injection amount. The initial value of $\Delta Q_{(c)}$ is set to be larger as the requested amount changes bigger.

In addition, if the count value of the compensation counter C is larger than "1", the ECU 40 calculates the transport delay compensating value $\Delta Q_{(c)}$ by multiplying the aforementioned initial value by an attenuation factor k. The attenuation factor k is initially "1.0" and decreases at almost a constant ratio each time the compensation counter C is increased until it reaches to "0". Therefore, the transport delay compensating value $\Delta Q_{(c)}$ gradually decreases to "0" after the total requested injection amount shows a sharp change.

After the transport delay compensating value $\Delta Q_{(c)}$ is calculated, it is judged whether the request up flag is ON (step 176). If the request up flag is ON, it is judged that the transport delay effect is making insufficient the amount of fuel which enters the cylinder. In this case, therefore, the amount $Q_D$ of fuel to be injected by the normal in-cylinder injection is obtained by adding the transport delay compensating value $\Delta Q_{(c)}$ to the reference in-cylinder injection amount $Q_{DB}$ (step 178).

If the result of the above-mentioned processing of step 176 indicates that the request up flag is not ON, it is judged that the transport delay effect is making excessive the amount of fuel which enters the cylinder. In this case, therefore, the amount $Q_D$ of fuel to be injected by the normal in-cylinder injection is obtained by subtracting the transport delay compensating value $\Delta Q_{(c)}$ from the reference in-cylinder injection amount $Q_{DB}$ (step 179).

In the system of this embodiment, the values obtained according to the procedure of FIG. 6 are treated as the amount of fuel to be injected by the port injection (port injection fuel amount) and the amount of fuel to be injected by the normal in-cylinder injection (reference in-cylinder injection fuel amount) (see FIG. 3). Then, as described so far, the reference in-cylinder injection fuel amount is changed by the processing sequence of FIG. 6 so as to compensate for the transport delay of the port-injected fuel. That is, the corrected reference in-cylinder injection fuel amount agrees with the solid line shown in FIG. 5C. In addition to the capabilities of the first embodiment, therefore, this system embodiment can effectively prevent the injection amount control accuracy from deteriorating due to the fuel transport delay.

The major benefits of the present invention described above are summarized as follows:

According to the first aspect of the present invention, in an internal combustion engine provided with aport injector and an in-cylinder injector, if the operating load on the internal combustion engine changes after the injection amount calculation timing, it is possible to calculate a correction amount of fuel corresponding to the change. By reflecting the correction amount in the cylinder injection amount, the load change can quickly be reflected in the injection fuel amount. Thus, the present invention can raise the response of the internal combustion engine.

According to the second aspect of the present invention, if a change of the operating load on the internal combustion engine is detected after the injection amount calculation timing and before a limit timing until which the amount of fuel to be injected by the normal in-cylinder injection can be changed, the amount of fuel to be injected by the normal cylinder injection can be increased or decreased. In this case, both the increase and decrease in the operating load can be reflected in the fuel injection amount.

According to the third aspect of the present invention, if an increase of the operating load on the internal combustion engine is detected after the limit timing until which the amount of fuel to be injected by the normal in-cylinder injection can be changed, a cylinder injection can be executed after the normal cylinder injection so as to inject the correcting amount of fuel corresponding to the increase. Thus, the present invention can raise the response at acceleration.

According to the fourth aspect of the present invention, even if zero is calculated as the reference cylinder injection amount at the injection amount calculation timing and an increase of the operating load on the internal combustion engine is detected later, a cylinder injection can be executed to inject a correction amount of fuel corresponding to the increase. Thus, the present invention can raise the response at acceleration.

According to the fifth aspect of the present invention, the deviation of the amount of fuel which actually enters the cylinder from the intake port from the ideal amount can be estimated based on the change of the load on the internal combustion engine. The reference cylinder injection amount can be increased or decreased so as to cancel the deviation. In this case, the error of the amount of fuel that enters the cylinder from the port due to the transport delay can be compensated for by the amount of fuel to be injected from the in-cylinder injector. Thus, the present invention can accurately control the injection amount during transient periods.

Further, the present invention is not limited to these embodiments, but variations and modifications may be made without departing from the scope of the present invention.

What is claimed is:

1. A fuel injection control device for an internal combustion engine, comprising:
   operating load detecting means for detecting an operating load on the internal combustion engine;
   a port injector for port injection;
   an in-cylinder injector for in-cylinder injection;
   fuel amount calculating means for calculating a port injection amount of fuel to be injected from the port injector and a reference in-cylinder injection amount of fuel to be injected from the in-cylinder injector at a predetermined injection amount calculation timing based on the operating load;
   port injection control means which starts a port injection before an in-cylinder injection so as to inject said port injection amount of fuel from the port injector;
   correction fuel amount calculation means which calculates a fuel correction amount for a change of the operating load on the internal combustion engine if the change is detected after the injection amount calculation timing and before a reflection limit timing until which the amount of fuel to be injected from the in-cylinder injector; and
   in-cylinder injection control means which executes the in-cylinder injection after the port injection so as to inject an amount of fuel from the in-cylinder injector wherein the amount of fuel is determined based on the reference in-cylinder injection amount and the correction amount.

2. A fuel injection control device for an internal combustion engine according to claim 1, wherein
   the in-cylinder injection control means includes normal in-cylinder injection means which starts a normal in-cylinder injection at a predetermined timing so as to inject the reference in-cylinder injection amount of fuel if a non-zero value is calculated as the reference in-cylinder injection amount; and
   the correction fuel amount calculation means includes normal in-cylinder injection amount correcting means which increases or decreases the amount of fuel to be injected by the normal in-cylinder injection by the correction amount of fuel corresponding to a change of the operating load on the internal combustion engine if the change is detected before a limit timing until which the amount of fuel to be injected by the normal in-cylinder injection is changed.

3. A fuel injection control device for an internal combustion engine according to claim 1, wherein
   the in-cylinder injection control means includes normal in-cylinder injection means which starts a normal in-cylinder injection at a predetermined timing so as to inject the reference in-cylinder injection amount of fuel if a non-zero value is calculated as the reference in-cylinder injection amount; and
   the correction fuel amount calculation means includes in-cylinder injection amount increasing means which executes an additional in-cylinder injection so as to inject the correcting amount of fuel corresponding to an increase of the operating load on the internal combustion engine if the increase is detected after a limit timing until which the amount of fuel to be injected by the normal in-cylinder injection is changed.

4. A fuel injection control device for an internal combustion engine according to claim 1, wherein the in-cylinder injection control means includes additional in-cylinder injection means which executes an in-cylinder injection after the port injection so as to inject the correcting amount of fuel corresponding to an increase of the operating load on the internal combustion engine if the increase is detected after zero is calculated as the reference in-cylinder injection amount.

5. A fuel injection control device for an internal combustion engine according to claim 1, wherein the fuel amount calculating means includes:
   port fuel deviation estimating means which estimates a deviation of the amount of fuel which actually enters a cylinder from an intake port from an ideal amount of fuel which should enters the cylinder from the intake port, based on the change of the load on the internal combustion engine; and
   reference amount correcting means which increases or decreases the reference in-cylinder injection amount so as to compensate for the deviation.

6. A fuel injection control device for an internal combustion engine, comprising:
- an operating load detecting unit for detecting an operating load on the internal combustion engine;
- a port injector for port injection;
- an in-cylinder injector for in-cylinder injection;
- a fuel amount calculating unit for calculating a port injection amount of fuel to be injected from the port injector and a reference in-cylinder injection amount of fuel to be injected from the in-cylinder injector at a predetermined injection amount calculation timing based on the operating load;
- a port injection control unit which starts a port injection before an in-cylinder injection so as to inject said port injection amount of fuel from the port injector;
- a correction fuel amount calculation unit which calculates a fuel correction amount for a change of the operating load on the internal combustion engine if the change is detected after the injection amount calculation timing and before a reflection limit timing until which the amount of fuel to be injected from the in-cylinder injector; and
- an in-cylinder injection control unit which executes the in-cylinder injection after the port injection so as to inject an amount of fuel from the in-cylinder injector wherein the amount of fuel is determined based on the reference in-cylinder injection amount and the correction amount.

7. A fuel injection control device for an internal combustion engine according to claim 6, wherein
- the in-cylinder injection control unit includes a normal in-cylinder injection unit which starts a normal in-cylinder injection at a predetermined timing so as to inject the reference in-cylinder injection amount of fuel if a non-zero value is calculated as the reference in-cylinder injection amount; and
- the correction fuel amount calculation unit includes a normal in-cylinder injection amount correcting unit which increases or decreases the amount of fuel to be injected by the normal in-cylinder injection by the correction amount of fuel corresponding to a change of the operating load on the internal combustion engine if the change is detected before a limit timing until which the amount of fuel to be injected by the normal in-cylinder injection is changed.

8. A fuel injection control device for an internal combustion engine according to claim 6, wherein
- the in-cylinder injection control unit includes a normal in-cylinder injection unit which starts a normal in-cylinder injection at a predetermined timing so as to inject the reference in-cylinder injection amount of fuel if a non-zero value is calculated as the reference in-cylinder injection amount; and
- the correction fuel amount calculation unit includes an in-cylinder injection amount increasing unit which executes an additional in-cylinder injection so as to inject the correcting amount of fuel corresponding to an increase of the operating load on the internal combustion engine if the increase is detected after a limit timing until which the amount of fuel to be injected by the normal in-cylinder injection is changed.

9. A fuel injection control device for an internal combustion engine according to claim 6, wherein the in-cylinder injection control unit includes an additional in-cylinder injection unit which executes an in-cylinder injection after the port injection so as to inject the correcting amount of fuel corresponding to an increase of the operating load on the internal combustion engine if the increase is detected after zero is calculated as the reference in-cylinder injection amount.

10. A fuel injection control device for an internal combustion engine according to claim 6, wherein the fuel amount calculating unit includes:
- a port fuel deviation estimating unit which estimates a deviation of the amount of fuel which actually enters a cylinder from an intake port from an ideal amount of fuel which should enters the cylinder from the intake port, based on the change of the load on the internal combustion engine; and
- a reference amount correcting unit which increases or decreases the reference in-cylinder injection amount so as to compensate for the deviation.

\* \* \* \* \*